United States Patent [19]

Masuda

[11] Patent Number: 5,144,306
[45] Date of Patent: Sep. 1, 1992

[54] NOISE SHAPING CIRCUIT
[75] Inventor: Toshihiko Masuda, Tokyo, Japan
[73] Assignee: Sony Corporation, Tokyo, Japan
[21] Appl. No.: 759,930
[22] Filed: Sep. 13, 1991
[30] Foreign Application Priority Data Sep. 20, 1990 [JP] Japan ................... 2-248875

[51] Int. Cl.$^5$ ............................................. H03M 7/36
[52] U.S. Cl. ...................................... 341/76; 341/200
[58] Field of Search ................. 341/76, 144, 143, 200, 341/102

[56] References Cited
U.S. PATENT DOCUMENTS 4,536,880  8/1985  Grallert .................. 341/143 X
5,030,952  7/1991  Ledzius et al. .............. 341/143

Primary Examiner—Sharon D. Logan
Attorney, Agent, or Firm—Lewis H. Eslinger; Jay H. Maioli

[57] ABSTRACT

A noise shaping circuit includes a first degree noise shaping arrangement in which a quantization error component at a first quantizer adapted for quantizing input signals is fed back to an input side, and in which a quantization error component at the first quantizer is fed back by a predetermined feedback circuit to an input of the first quantizer. The feedback circuit includes a synthesizing unit supplied with an error signal from a first quantization error output unit, a second quantizer for quantizing an output signal from the synthesizing unit, a second quantization error output unit for taking out a quantization error at the second quantizer, a transfer characteristic unit having predetermined transfer characteristics, and a differentiation unit supplied with output signals from the second quantizer. Error signals from the second quantization error output unit are supplied to the transfer characteristic unit, the output of which is supplied to the synthesizing unit.

6 Claims, 4 Drawing Sheets

NOISE SHAPING CIRCUIT

BACKGROUND OF THE INVENTION

1. Field of the Invention

This invention relates to a noise shaping circuit and, above all, to a noise shaping circuit advantageously employed in, for example, a 1-bit D/A converter.

2. Related Art

Recently, an oversampling type 1-bit D/A converting system is attracting attention as a high precision D/A converting system employed in audio equipment or the like. The basic construction of this type of the D/A converting system is shown in FIG. 1.

In this figure, digital signals supplied to an input terminal 101 are oversampled at a suitable oversampling factor by an oversampling circuit 102, constituted by a digital filter or the like, before being transmitted to a noise shaping circuit 103. In this noise shaping circuit 103, the digital signals are requantized to an order of several bits, 1 to 5 bits under the current state of the art. At this time, noises produced on requantization, or quantization errors, are fed back so as to be shifted to a higher frequency side to produce a noise spectrum distribution which is suppressed towards the lower frequency. Output data of several bits from the noise shaping circuit 103 are converted by a 1-bit D/A converter 104, constituted by a PWM circuit or the like, into 1-bit waveform data, which are outputted at an output terminal 105. Although a D/A converter for conversion into multi-bit waveform data may be used in place of the 1-bit D/A converter 104, it is necessary to overcome such problems as non-linear distortion on differentiation, glitch or the like.

For realizing a wide dynamic range with this system, a wide dynamic range is required of the noise shaping circuit 103. Among the factors governing the dynamic range of the noise shaping circuit 103 are an operating rate $f_{NS}$, the number of degrees N and the number of bits M of the requantizer. Although the dynamic range is improved by raising the operating rate $f_{NS}$, limitations are imposed on the operating rate $f_{NS}$ by an upper limit value of the operating rate of semiconductor devices. It is therefore contemplated to improve the S/N ratio by raising the number of degrees N.

FIG. 2 shows a noise shaping circuit of a customary N'th degree type or N-tuple integration type. Output signals from the oversampling circuit 102 shown in FIG. 1 are supplied to an input terminal 111 of the noise shaping circuit shown in FIG. 2, and output signals from an output terminal 112 are transmitted to the 1-bit D/A converter 104 shown in FIG. 1.

An output of a quantizer 113 of the noise shaping circuit of FIG. 2 is taken out via a 1-sample delay device 114 so as to be fed back to an input side of the quantizer 113. An integrator of a first degree $116_1$ is connected between an input terminal of the quantizer 113 and an adder $115_1$ which in effect is a subtractor subtracting the feedback signal from the input signal. The integrator $116_1$ is made up of an adder and a 1-sample delay element and adapted for delaying an output of the adder by one sample and feeding back the delayed data to the adder. The above is the basic construction of the noise shaping circuit of the first degree. With increase in the number of degrees, a number equal to the number of degrees of sets each consisting of an integrator and a negative feedback adder is provided in tandem in the direction of the input terminal, so that a noise shaping circuit of an N'th degree may be provided by providing an N number of sets each consisting of an integrator and an adder. FIG. 2 shows a typical construction of the N'th degree noise shaping circuit in which an N'th adder or subtractor $115_N$ is connected to the input terminal 111 and an N'th integrator $116_N$ is connected between the adder $115_N$ and the next (N-1)st adder $115_{N-1}$. Output signals of the quantizer 113 delayed by the 1-sample delay device 114 are supplied to the adders $115_N$ to $115_1$ and resulting 1-sample delay output signals are subtracted from input signals to the adders $115_N$ to $115_1$.

It is noted that if, in the N'th degree noise shaping circuit shown in FIG. 2, an input to the input terminal 111 is X, an output from the output terminal 112 is Y and an quantization error produced at the quantizer 113 is $\epsilon_0$, the output Y is given by $$Y = X + (1 - z^{-1})^N \epsilon_O \qquad (1)$$

However, with the above construction, if the number of degrees is three or more, the integrator is overloaded to produce an unstable operation.

Although a multi-stage noise shaping circuit may be contemplated, inputs to respective circuit stages represent quantization errors of the preceding circuit stages, so that outputs of the respective circuit stages represent noise components. Since noise components of the second circuit stage et seq. are summed to the ultimate output, the dynamic range tends to be deteriorated.

SUMMARY OF THE INVENTION

It is therefore a principal object of the present invention to provide a noise shaping circuit in which noise shaping of a higher degree may be performed stably and the dynamic range may be prevented from being deteriorated effectively.

According to the present invention, there is provided a noise shaping circuit comprising a first quantizer for quantizing input signals, a first degree noise shaping arrangement for feeding back a quantization error component at said first quantizer to an input side of the circuit, first quantization error outputting means for taking out a quantization error at said first quantizer, synthesizing means supplied with an error signal from said first quantization error outputting means, a second quantizer for quantizing output signals from said synthesizing means, second quantization error outputting means for taking out a quantization error at said second quantizer, transfer function means having a predetermined transfer function, said transfer function means being supplied with an error signal from said second quantization error outputting means and transmitting an output to said synthesizing means, differentiation means supplied with an output signal from said second quantizer, and addition means for adding output signals from said second quantizer to an input of said first quantizer.

The synthesizing means, the second quantizer, the second quantization error outputting means, transfer function means and the deafferentation means constitute a feedback circuit for performing a higher degree noise shaping.

Since the output from the feedback circuit adapted for performing higher degree noise shaping is fed back to the input side of the first quantizer without being added to the ultimate output from the first quantizer, the dynamic range at the ultimate output is not deteriorated, while the resolution at the second quantizer may be improved for stabilizing the operation of the circuit.

Embodiments

Figure 3:
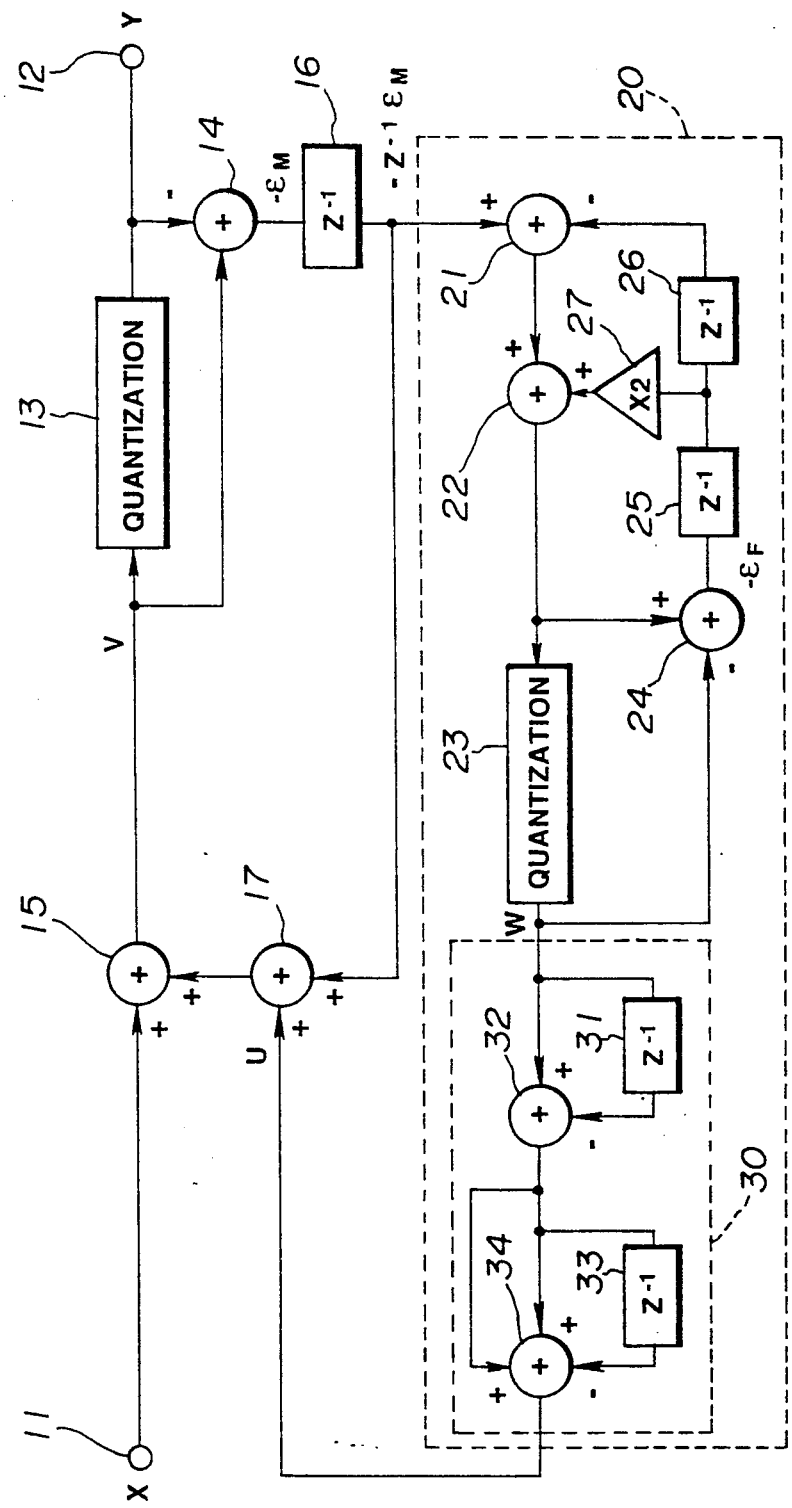
FIG. 3 is a block circuit diagram showing a first embodiment of a noise shaping circuit according to the present invention.

FIG. 3 is a block circuit diagram showing a first embodiment of a noise shaping circuit according to the present invention.

Figure 1:
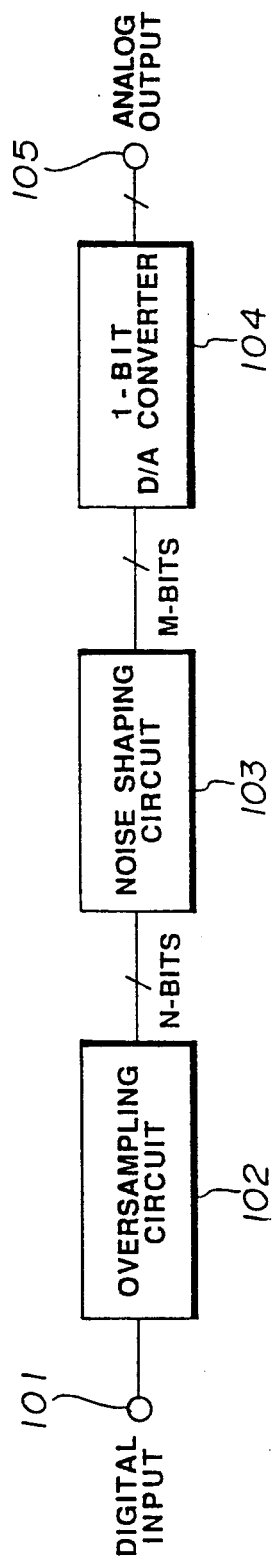
FIG. 1 is a block circuit diagram schematically showing an overall arrangement of a 1-bit D/A converter.
Figure 2:
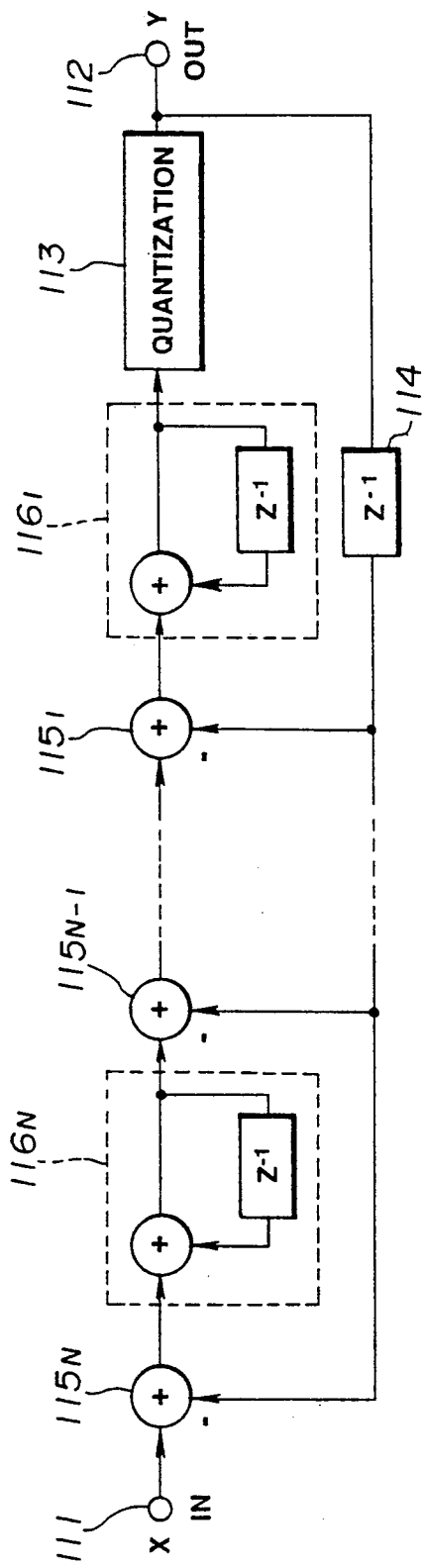
FIG. 2 is a block circuit diagram of a conventional noise shaping circuit of an N'th degree.

In the noise shaping circuit, shown in FIG. 3, digital audio signals, oversampled at a suitable oversampling rate by an oversampling circuit similar to the circuit 102 described in connection with FIG. 1, are supplied to an input terminal 11, and output signals from an output terminal 12 are supplied to a 1-bit D/A converter 104, such as the D/A converter described in connection with FIG. 1, so as to be converted into a 1-bit waveform signal. A requantizer 13 connected between the input and output terminals requantizes an input digital audio signal of e.g. 20 bits into a requantized signal of serveral bits, which requantized signal is outputted. A quantization error $-\epsilon_M$ generated by the quantizer 13 is taken out at an adder 14, which is in effect a subtractor, and is fed back via a 1-sample delay device 16 and an adder 17, to an input side adder 15, by way of performing first-degree noise shaping. On the other hand, the quantization error produced by the adder 14 is fed back via a feedback circuit 20 to the adder 15 by way of performing noise shaping of higher degrees. The adder 14 subtracts an output of the quantizer 13 from its input to take out the quantization error $-\epsilon_M$.

Turning to the feedback circuit 20, a signal produced by delaying the quantization error from the adder 14 by one sample at a delay circuit 16 is supplied to an adder (subtractor) 21, functioning as a synthesizer, the output of which is supplied via an adder 22 to a quantizer 23. A quantization error produced at the quantizer 23 is taken out at an adder 24, which in effect is a subtractor, and is supplied to adders 21 and 22 as synthesizing means, by means of a transmission characteristic circuit including 1-sample delay elements 25 and 26 and a coefficient multiplier 27 with a multiplication coefficient of 2. An output from the quantizer 23 is transmitted to an adder 17 as feedback output signals by means of a second-degree differentiating circuit 30 so as to be summed to the output from the 1-sample delay element 16. An addition output from the adder 17 is supplied to the input side adder 15. Meanwhile, a second degree differentiating circuit 30 is made up of a delay element 31 for delaying the output from the quantizer 23 by one sample, an adder (subtractor) 32 for subtracting an output of the delay element 31 from the output of the quantizer 23, a delay element 33 for delaying the output from the adder 32 by one sample, and an adder (subtractor) 34 to which outputs from the adder 32 are inputted twice (by two separate routes) as addition signals and to which an output from the delay element 33 is also inputted as a subtraction signal.

In the above construction, if an input to the input terminal 11 is X, an output from the output terminal 12 is Y and an input to the quantizer 13 from the adder 15 is V, the quantization error produced at the quantizer 13 $\epsilon_M$ is given by $$\epsilon_M = Y - V \quad (2)$$

Since the adder (subtractor) 14 subtracts the output Y from the input V to the quantizer 13, a signal $-\epsilon_M$ is taken out at the adder 14 and delayed by one sample by the delay element 16 so that $-z^{-1}\epsilon_M$ is supplied to the feedback circuit 20. If a quantization error at the quantizer 23 is $\epsilon_F$, a signal $-\epsilon_F$ is outputted at the adder 24 and delayed by two samples by delay elements 25 and 26 to produce a signal $-z^{-2}\epsilon_F$ which signal is supplied to the adder 21 where it is subtracted from the signal $-z^{-1}\epsilon_M$ from the delay element 16. Thus the output from the adder 21 is $$-z^{-1}\epsilon_M + z^{-2}\epsilon_F$$

Since the output is supplied to the adder 22 and summed to an output $-2z^{-1}\epsilon_F$ from the coefficient multiplier 27, the output from the adder 2 becomes $$z^{-1}\epsilon_M - 2z^{-1}\epsilon_F + z^{-2}\epsilon_F.$$

Since the aforementioned quantization error $\epsilon_F$ is generated and added to this output requantized by the quantizer 23, an output W from the quantizer 23 becomes $$W = z^{-1}\epsilon_M + \epsilon_F - 2z^{-1}\epsilon_F + z^{-2}\epsilon_F = -z^{-1}\epsilon_M + (1 - z^{-1})^2 \epsilon_F \quad (3)$$

This equation is equivalent to the formula (1) for the input and the output of the noise shaping circuit of the N'th degree in which X is $-z^{-1}\epsilon_M$, N is equal to 2 and the quantization error $\epsilon_0$ is $\epsilon_F$, indicating that the circuit from the adder 21 through the transfer function circuit to the quantizer 23 is equivalent to the second degree noise shaping circuit. Since the sum of the output W of the quantizer 23 once differentiated by the differentiator 30 and the output W twice differentiated by the differentiator 30 is taken out from the differentiator 30, an output U of the differentiator 30 becomes $$U = (1 - z^{-1})W + (1 - z^{-1})^2 W = (2 - z^{-1})(1 - z^{-1})W \quad (4)$$

Since the output U is summed at the adder 17 to the output $-z^{-1}\epsilon_M$ from the delay element 16 and further summed at the next adder 15 to the input X, the input V supplied from the adder 15 to the quantizer 13 is given by $$V = U - z^{-1}\epsilon_M + X \quad (5)$$

When the input V is requantized by the quantizer 13, the quantization error $\epsilon_M$ is superimposed on the input to produce the output Y, so that $$Y = V + \epsilon_M = U - z^{-1}\epsilon_M + X + \epsilon_M = X + U + (1 - z^{-1})\epsilon_M \quad (6)$$

Substituting the above equation (4) for U of the equation (6), $$Y = X + (2-z^{-1})(1-z^{-1})W + (1-z^{-1})\epsilon_M \quad (7)$$

Substituting the above equation (3) for W of the equation (7) and putting the equation into order, $$Y = X + (1-z^{-1})^3 \epsilon_M + (2-z^{-1})(1-z^{-1})^3 \epsilon_F = X + (1-z^{-1})^3(\epsilon_M + \epsilon_F) + (1-z^{-1})^4 \epsilon_F \quad (8)$$

As may be seen from the equation (8), input and output characteristics of the circuit of FIG. 1 represent third and fourth degree noise shaping characteristics.

It is noted that, since the arrangement of feeding back the quantization error component output from the delay element 16 to the adder 15 via adder 17 represents an arrangement of a first degree noise shaping circuit, a stable operation may be assured. As for the second degree noise shaping circuit arrangement of the feedback circuit 20 extending from the adder 21 to the quantizer 23, since the output of the noise shaping circuit is fed back via differentiating circuit 30 to the input side of the quantizer 13 without being summed to the ultimate output of the quantizer 13, the number of quantizing bits of the quantizer 23 may be increased for improving the resolution and reducing the quantization error. In addition, the integrator may be prevented from being overloaded to assure stable operation while the dynamic range at the ultimate output is not deteriorated.

Meanwhile, since the quantizer 23 in the feedback circuit 20 may be improved in resolution in this manner, the magnitude of the quantization error $\epsilon_F$ becomes negligibly small as compared with the maximum amplitude of the quantization error $\epsilon_M$ of the main quantizer 13. Since the third term $(1-z^{-1})^4 \epsilon_F$ at the right side of the equation (8) becomes extremely small as compared to its second term, the equation (8) may be rewritten to $$Y \approx X + (1-z^{-1})^3(\epsilon_M + \epsilon_F) = X + (1-z^{-1})^3 \epsilon_M (1 + \epsilon_F/\epsilon_M) \approx X + (1-z^{-1})^3 \epsilon_M$$

so that, apparently, third-degree noise shaping characteristics appear predominantly.

Figure 4:
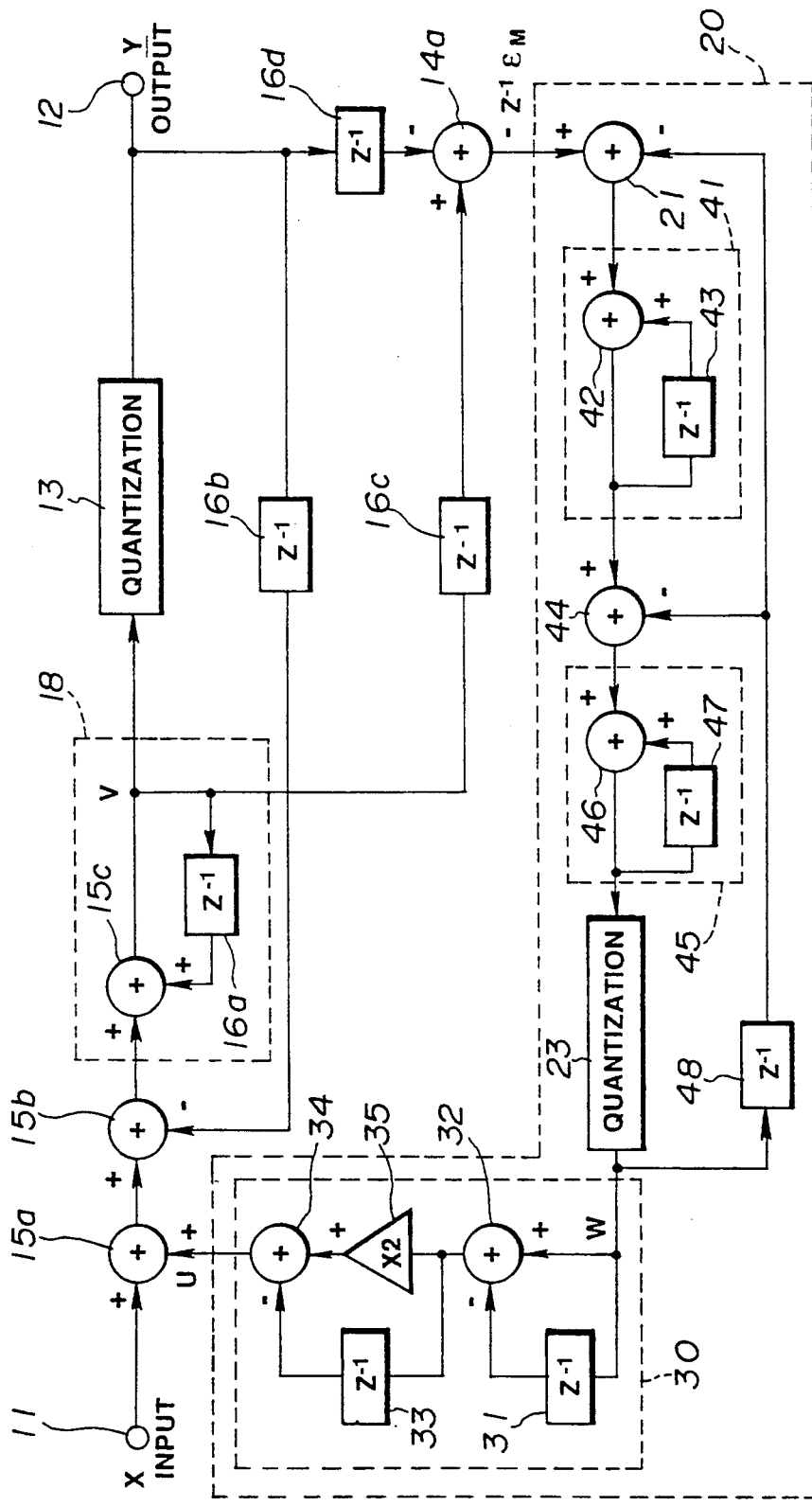
FIG. 4 is a block circuit diagram showing a second embodiment of the present invention.

The noise shaping circuit having apparent third-degree noise shaping characteristics may be realized by a circuit according to a second embodiment of the present invention as shown in FIG. 4, in which components similar to those shown in FIG. 3 are depicted by the same reference numerals and the corresponding description is omitted.

In the second embodiment, shown in FIG. 4, by way of a first degree noise shaping, an integrator 18 is connected to an input side of the main quantizer 13, and an output of the quantizer 13 is supplied to an adder 15b at the input side of the integrator 18 via a one-sample delay element 16b so as to be subtracted from the input for negatively feeding back the quantization error component of the quantizer 13. Besides, by way of higher degree noise shaping, the quantization error of the quantizer 13 is negatively fed back to the adder 15a at the side of the input terminal 11 by means of the feedback circuit 20. That is, the output of the quantizer 13 delayed by one sample by the delay element 16d is subtracted by the adder 14a from the input to the quantizer 13 delayed by one sample by the delay element 16c to take out the quantization error of the quantizer 13. The quantization error thus taken out is supplied to the feedback circuit 20. The feedback circuit 20 is constituted by a second degree noise shaping circuit, made up of two integrators 41 and 45 connected to the input side of the quantizer 23, and a differentiating circuit 30 for differentiating the output from the second degree noise shaping circuit. The quantization error from the adder 14a is transmitted to the quantizer 23 by means of adder 21, integrator 41, adder 44 and integrator 45, while the output of the quantizer 23 is delayed by one sample by a delay element 48 before being negatively fed back as subtraction signals to the adders 44 and 21. Meanwhile, the integrator 41 is adapted for feeding back the output from the adder 42 to the adder 42 by means of a one-sample delay element 43, whilst the integrator 45 is adapted for feeding back the output from the adder 46 to the adder 46 via one-sample delay circuit 43. From the equation (1), the output W from the second degree noise shaping circuit is given by $$W = -z^{-1} \epsilon_M + (1-z^{-1})^2 \epsilon_F$$

which is the same as the equation (3) so that the resulting operation is also the same. The differentiating circuit 30, to which the output W is supplied, is identical with the differentiating circuit 30 shown in FIG. 1, in which the twofold input (inputs via two separate routes) from the adder 32 to the adder 34 is expressed by an ×2 coefficient multiplier 35.

In FIG. 4, an operation equivalent to that of the adders 14 and 15 of FIG. 3 is realized by adders 15a, 15b and 15c, whilst an operation equivalent to that of the 1-sample delay element 16 of FIG. 3 is realized by four 1-sample delay elements 16a to 16d.

Since the operation and effect of the second embodiment shown in FIG. 4 is the same as that of the first embodiment shown in FIG. 3, the detailed description therefor is omitted for simplicity.

Figure 5:
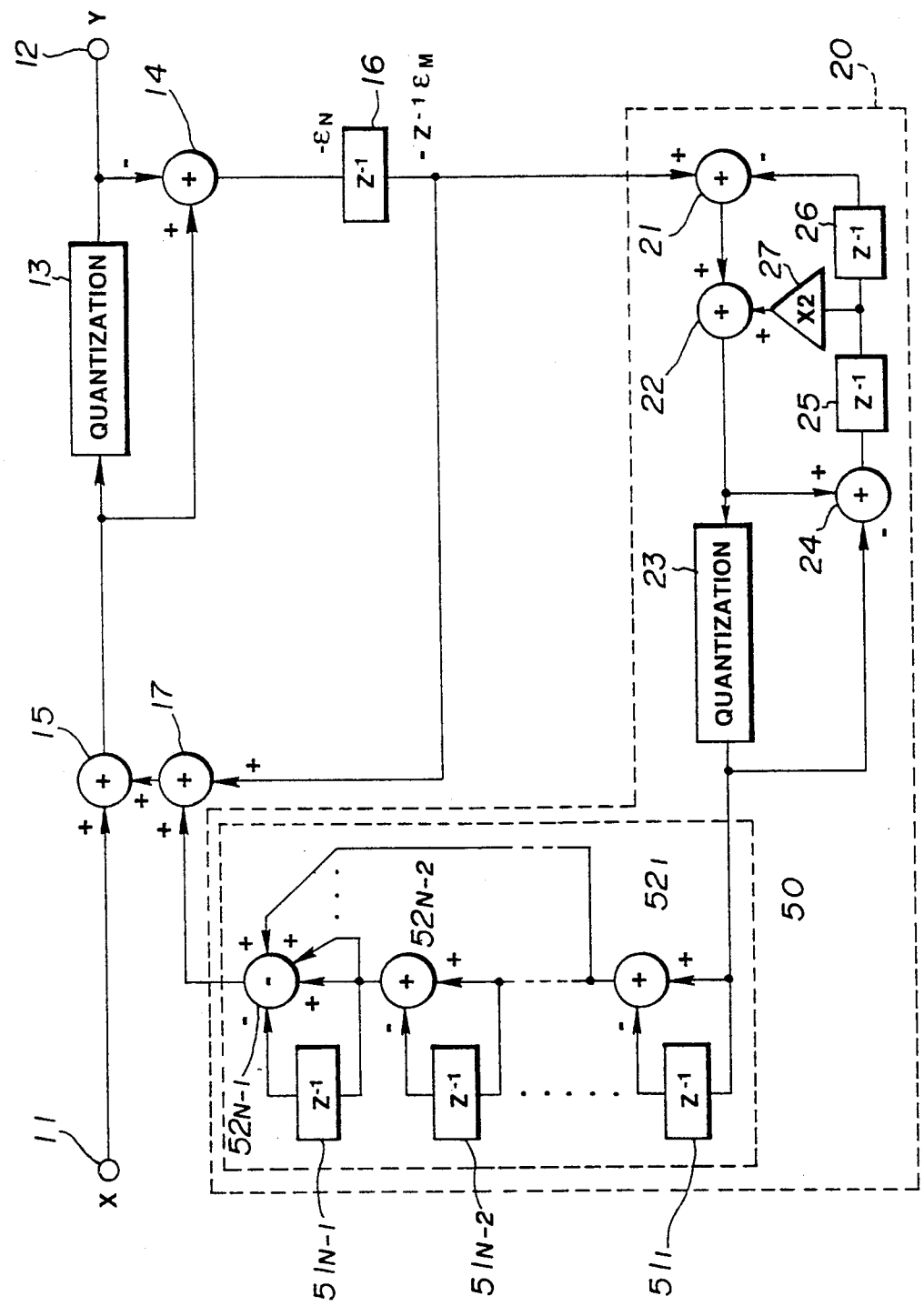
FIG. 5 is a block circuit diagram showing a third embodiment of the present invention.

FIG. 5 shows a third embodiment of the present invention wherein the third degree noise shaping circuit of the first embodiment is extended to a more generalized N'th degree circuit configuration. In FIG. 5, components similar to those shown in FIG. 1 are denoted by the same reference numerals and the corresponding description is omitted for simplicity.

For obtaining N'th degree noise shaping characteristics in general, a differentiating circuit 50, in which (N−1) stages of differentiators are connected in cascade so that outputs from the respective differentiators are summed together, is used in place of the differentiating circuit 30 consisting of a cascade connecting of two stages of differentiators. More specifically, a differentiator is provided as a first stage amplifier in which the output from the quantizer 23 is supplied from the quantizer 23 via 1-sample delay element $51_1$ to an adder (in effect, a subtractor) $52_1$ for subtracting it from the input (that is, the output from the quantizer 23). The output from the first stage amplifier, that is the output from the adder $52_1$, is supplied to the second stage differentiator as well as to the adder $52_{N-1}$ of the last or (N−1) stage amplifier. In the similar manner, the output of each stage amplifier is supplied to the next stage amplifier as well as to the adder $52_{N-1}$ of the last or (N−1) stage differentiator to make up the differentiating circuit 50. The circuit construction is otherwise the same as that of the first embodiment shown in FIG. 3.

The output Y to the input X in the noise shaping circuit of the present third embodiment is given by $$Y = X + (1-z^{-1})^N \epsilon_M + ((1-z^{-1})^3 + (1-z^{-1})^4 + \ldots + (1-z^{-1})^N + (1-z^{-1})^{N+1}) \epsilon_F \quad (10)$$

If the resolution of the quantizer 23 in the feedback circuit 20 is selected to be finer than that of the main quantizer 13, $\epsilon_M > > \epsilon_F$, so that the equation (10) may be approximated to an equation (11)

$$Y \approx X + (1-z^{-1})^N \epsilon_M \qquad (11)$$

so that the N'th degree noise shaping characteristics are produced.

Since the operation and effect of the present third embodiment is similar to that of the first embodiment, detailed description therefor is omitted for simplicity.

From the foregoing it is seen that the present invention provides a noise shaping circuit in which, for performing a high degree noise shaping by feeding back a quantizaion error from a first quantizer to the input side of the first quantizer, error signals from first quantization error output means are supplied via synthesizing means to a second quantizer, a quantization error at the second quantizer is supplied via transfer function means to the synthesizing means and output signals from the second quantizer are supplied via differentiating means to the input side of the first quantizer, so that the output from the high degree noise shaping feedback circuit is not summed to the ultimate output from the first quantizer and hence the dynamic range at the final output is not deteriorated. On the other hand, the operation may be stabilized because the resolution of the second quantizer may be improved and the quantization errors may be diminished.

What is claimed is:

1. A noise shaping apparatus for producing M-bit output digital data by requantizing N-bit input digital data, the noise shaping apparatus comprising:
    a first quantizer for quantizing said input digital data,
    a first feedback circuit for feeding back a quantization error component of said first quantizer to an input side of said first quantizer for constituting a first degree noise shaping circuit, and
    a second feedback circuit for feeding back a quantization error component of said first quantizer to an input side of said first quantizer,
    said second feedback circuit comprising
    synthesizing means to which quantization error signals from said first quantizer are supplied,
    a second quantizer for quantizing output signals from said synthesizing means,
    transfer characteristic means for applying predetermined transfer characteristics to quantization errors of said second quantizer, an output of said transfer characteristic means being supplied to said synthesizing means, and
    differentiation means for differentiating an output of said second quantizer for supplying a differentiated output to an input side of said first quantizer.

2. The noise shaping apparatus as claimed in claim 1 wherein said differentiation means comprises a plurality of differentiating circuits connected in series and including a last stage differentiating circuit, an output of each of the differentiating circuits being summed to form an output of the last stage differentiating circuit.

3. The noise shaping apparatus as claimed in claim 2 wherein said summation means, said second quantizer and the transfer characteristic means make up a second degree noise shaping circuit.

4. The noise shaping apparatus according to claim 3 wherein said synthesizing means comprises a first synthesizing circuit supplied with a quantization error signal of said first quantizer and a signal which is a quantization error signal of said second quantizer delayed by two samples by said transfer characteristic means, and a second synthesizing circuit supplied with an output of said first synthesizing circuit and a signal which is the quantization error signal of said second quantizer delayed by said transfer characteristic means by one sample and which is multiplied by a predetermined coefficient.

5. The noise shaping apparatus as claimed in claim 3 further comprising an integrator, wherein said synthesizing means comprises a first synthesizing circuit supplied with a quantization error signal of said first quantizer and a signal which is a quantization error signal of said second quantizer delayed by one sample by said transfer characteristic means and a second synthesizing circuit supplied with a signal which is said quantization error signal of said second quantizer delayed by one sample by said transfer characteristic means, the output of said second synthesizing circuit being supplied to said second quantizer via said integrator.

6. The noise shaping apparatus as claimed in claim 2 further comprising an integrator, wherein a quantization error component of said first quantizer is delayed by one sample and summed to said input digital data and the resulting summed data are supplied to said first quantizer via said integrator.

* * * * *